United States Patent
Sakura et al.

(10) Patent No.: US 8,246,498 B2
(45) Date of Patent: Aug. 21, 2012

(54) CHAIN TRANSMISSION DEVICE

(75) Inventors: Shunji Sakura, Osaka (JP); Akira Hirai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 585 days.

(21) Appl. No.: 12/392,373

(22) Filed: Feb. 25, 2009

(65) Prior Publication Data

US 2009/0247340 A1   Oct. 1, 2009

(30) Foreign Application Priority Data

Mar. 31, 2008   (JP) ................................. 2008-090501

(51) Int. Cl.
   *F16G 13/04*   (2006.01)
(52) U.S. Cl. ....................................................... 474/212
(58) Field of Classification Search .................. 474/161, 474/164, 212
   See application file for complete search history.

(56) References Cited

U.S. PATENT DOCUMENTS

| | | | | |
|---|---|---|---|---|
| 638,790 A | * | 12/1899 | Wunderlich | 474/157 |
| 2,199,292 A | * | 4/1940 | Pierce | 474/156 |
| 4,342,560 A | * | 8/1982 | Ledvina et al. | 474/157 |
| 5,690,571 A | * | 11/1997 | Mott | 474/212 |
| 5,967,926 A | * | 10/1999 | Kozakura et al. | 474/213 |
| 6,171,209 B1 | * | 1/2001 | Matsuda | 474/213 |
| 6,656,072 B2 | * | 12/2003 | Sugita et al. | 474/161 |
| 7,059,985 B2 | * | 6/2006 | Markley et al. | 474/213 |
| 7,094,170 B2 | * | 8/2006 | Young | 474/161 |
| 8,033,389 B2 | * | 10/2011 | Missman et al. | 198/851 |
| 2002/0013191 A1 | * | 1/2002 | Saito et al. | 474/213 |
| 2006/0073927 A1 | * | 4/2006 | Haesloop | 474/161 |
| 2009/0105024 A1 | * | 4/2009 | Sakura et al. | 474/156 |
| 2009/0247337 A1 | * | 10/2009 | Sakura et al. | 474/156 |
| 2010/0173739 A1 | * | 7/2010 | Sakura | 474/226 |

FOREIGN PATENT DOCUMENTS

| | | |
|---|---|---|
| JP | 56-028338 B2 | 3/1981 |
| JP | 57-96835 | 12/1982 |
| JP | 11-236950 | 8/1999 |

* cited by examiner

*Primary Examiner* — Thomas B Will
*Assistant Examiner* — Joan D Misa
(74) *Attorney, Agent, or Firm* — Howson & Howson LLP

(57) ABSTRACT

In a chain transmission, the link plates of a roller chain or rollerless bushing chain are formed with pairs of teeth. A sprocket has a central set of sprocket teeth for meshing with the rollers or bushings, and sets of side sprocket teeth for meshing with the teeth of the link plates. The teeth of the link plates function as a silent chain. After an inner flank of a link plate tooth comes into contact with a side sprocket tooth, a roller and an outer flank of the link plate tooth are seated on the sprocket.

5 Claims, 16 Drawing Sheets

CHAIN TRANSMISSION DEVICE

CROSS-REFERENCE TO RELATED APPLICATION

This application claims priority on the basis of Japanese patent application 2008-090501, filed Mar. 31, 2008. The disclosure of Japanese application 2008-090501 is hereby incorporated by reference.

FIELD OF THE INVENTION

The invention relates to a chain transmission in a chain is wound around sprockets to transmit power. A typical application of a chain transmission is the transmission of power to auxiliary equipment such as an oil pump in an engine, or the transmission of power from an engine crankshaft to the camshafts that operate the engine's intake and exhaust valves.

BACKGROUND OF THE INVENTION

In chain transmissions, it is common to use a roller chain, a rollerless bushing chain, or a silent chain. Furthermore, hybrid chains in which the features of a silent chain and the features of a roller chain or bushing chain are combined have been used in a chain transmission.

A typical chain transmission incorporating such a hybrid chain is shown in FIGS. 15 and 16. In FIG. 15, a chain 510 comprises link plates 511, which function as a silent chain. Link plates 511, each of which has a pair of teeth are disposed along both sides of the chain in alternating, overlapping, relationship. Link plates 512, which do not have teeth, are disposed in alternating, overlapping, relationship along the inside of the chain, and cooperate with rollers 520 in such a way as to function as a roller chain. The link plates 511 and 512 are connected by connecting pins 530. A sprocket 550, shown in FIG. 16, has teeth 552, which cooperate with the teeth of plates 511, and teeth 551, which cooperate with the rollers 520.

In the operation of the chain transmission, teeth of the link plates 511, which function as a silent chain, engage sprocket teeth 552. When a tooth of a link plate 511 is seated on a sprocket tooth 552, a roller 520 engages a sprocket tooth 551. Further details of the chain transmission just described can be found in Japanese Examined Patent Publication No. Sho. 59-30936.

A chain transmission using a convention silent chain exhibits significant elongation due to wear of its connecting pins, and the elongation of the chain is accompanied by a reduction in its strength. In a chain transmission using a conventional roller chain, obtaining high strength is difficult, especially because of difficulties in strengthening the rollers. Furthermore, conventional roller chains produce a large amount of noise as they come into engagement with a sprocket.

In the hybrid chain describe above, in which the outer link plates function as a silent chain, the problem of elongation due to wear of the connecting pins has not been overcome. Thus, as in the case of a conventional silent chain, elongation of the chain occurs, and is accompanied by a decrease in strength.

Another problem with the hybrid chain is that, because it has a total of eight plates in the direction of the chain width, and various different components, assembly of the chain is complicated.

This invention addresses the above-described problems by providing a chain transmission in which engagement noise is reduced, in which a decrease in chain strength due to elongation resulting from excessive wear of the connecting pins is avoided, and the number of different components is relatively small so that assembly of the chain is made easier.

SUMMARY OF THE INVENTION

The chain transmission according to the invention comprises a chain and a sprocket in mesh with the chain. The chain comprises outer links and inner links in alternating, overlapping relationship. Each outer link comprises a pair of outer link plates in laterally spaced relationship, the outer link plates of each pair being connected by a pair of connecting pins secured respectively in front and rear pin holes in the pair of outer link plates. Each inner link comprises a pair of inner link plates in laterally spaced relationship, the inner link plates of each pair being connected by a pair of bushings secured respectively in front and rear bushing holes in the pair of inner link plates. Each connecting pin of each outer link extends through, and is rotatable in, a bushing of an overlapping inner link. Each of the outer link plates and each of the inner link plates are formed with front and rear link plate teeth, each having an inner flank and an outer flank. The sprocket has central sprocket teeth which engage with the bushings, or with rollers rotatable on the bushings. The sprocket also has side sprocket teeth which engage with the link plate teeth.

The link plate teeth, the central sprocket teeth, and the side sprocket teeth are shaped so that, as the chain is wound around the sprocket, an inner flank of a front tooth of a link plate first comes into contact with a side sprocket tooth, thereafter a bushing or roller adjacent said front link plate tooth comes into contact with a central sprocket tooth, and thereafter, when a bushing or roller adjacent the rear tooth of said link plate is seated on a tooth gap bottom of said sprocket, an outer flank of said front tooth and an outer flank of said rear tooth come into contact with side sprocket teeth.

Perferably, side sprocket teeth are provided on both sides of the central sprocket teeth.

In an alternative embodiment, link plate teeth are provided on both upper and lower sides of the outer and inner link plates.

Preferably, the number of inner link plates in each inner link is two, and the number of outer link plates in each outer link is two. Then, a hybrid silent chain/roller chain transmission, which has a relatively small number of different components, and which is as easy to assemble as a conventional roller chain, can be obtained.

Engagement noises are significantly reduced, in particular because the bushings or rollers are prevented from colliding with the sprocket teeth as in the case of a transmission using a conventional roller chain or rollerless bushing chain.

Transmission of power is primarily through bushings or rollers. Therefore a decrease in strength of the chain, due to elongation as a result of wear of the connecting pins, can be prevented. At the same time, since the outer flanks of the link plate teeth come into contact with the side sprocket teeth, the link plates are positioned so that bushings or rollers are stably seated on the tooth gap bottoms of the central sprocket teeth, and vibration and noise can be significantly reduced.

When side sprocket teeth are provided on both sides of the central sprocket teeth, power is uniformly transmitted by both sides of the chain, and vibration and noise are further reduced.

When link plate teeth are provided on both the upper and lower sides of the outer and inner link plates, assembly of the chain becomes easier as it is unnecessary to take into account the direction of the link plate teeth. At the same time, the chain can be used in a transmission in which the chain meshes with sprockets on the exterior of the loop formed by the chain as well as with sprockets on the interior of the loop.

DETAILED DESCRIPTION OF THE PREFERRED EMBODIMENTS

In the chain transmission according to the invention, the chain construction is similar to that of a roller chain or rollerless bushing chain. However, the link plates are formed with front and rear teeth similar to those of a conventional silent chain. The rollers or bushings mesh with central teeth on a sprocket, and the teeth formed on link plates mesh with side sprocket teeth, preferably on both sides of the central teeth. The rollers and teeth are formed so that engagement of the elements of the chain with the sprocket teeth takes place in a sequence such that engagement noise is reduced while elongation and reduction in strength due to wear of the connecting pins are also reduced. In addition, the number of chain components is small and assembly of the chain is relatively simple.

Figure 1:
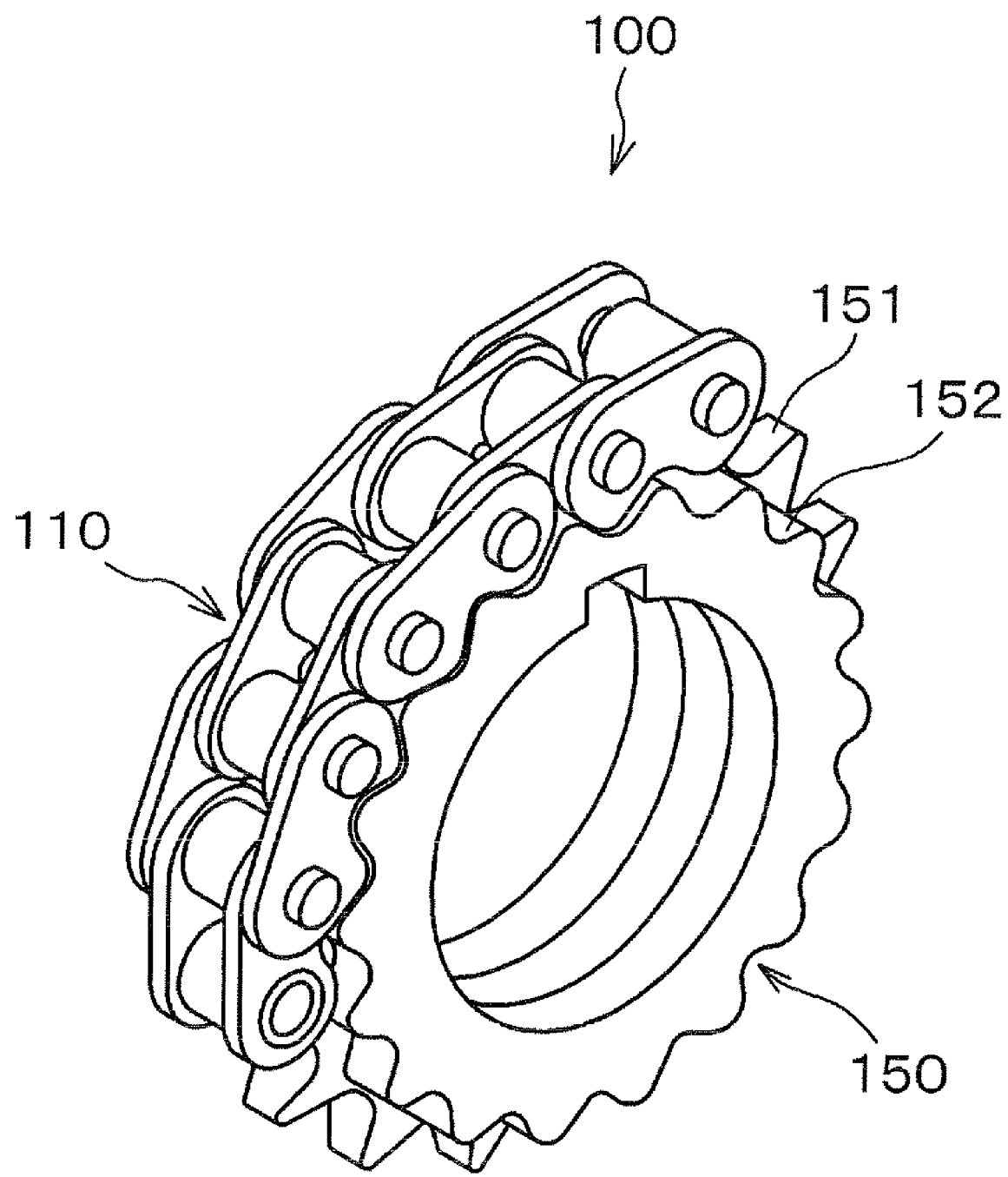
FIG. 1 is a perspective view of a part of a chain transmission in accordance with the invention.
Figure 2:
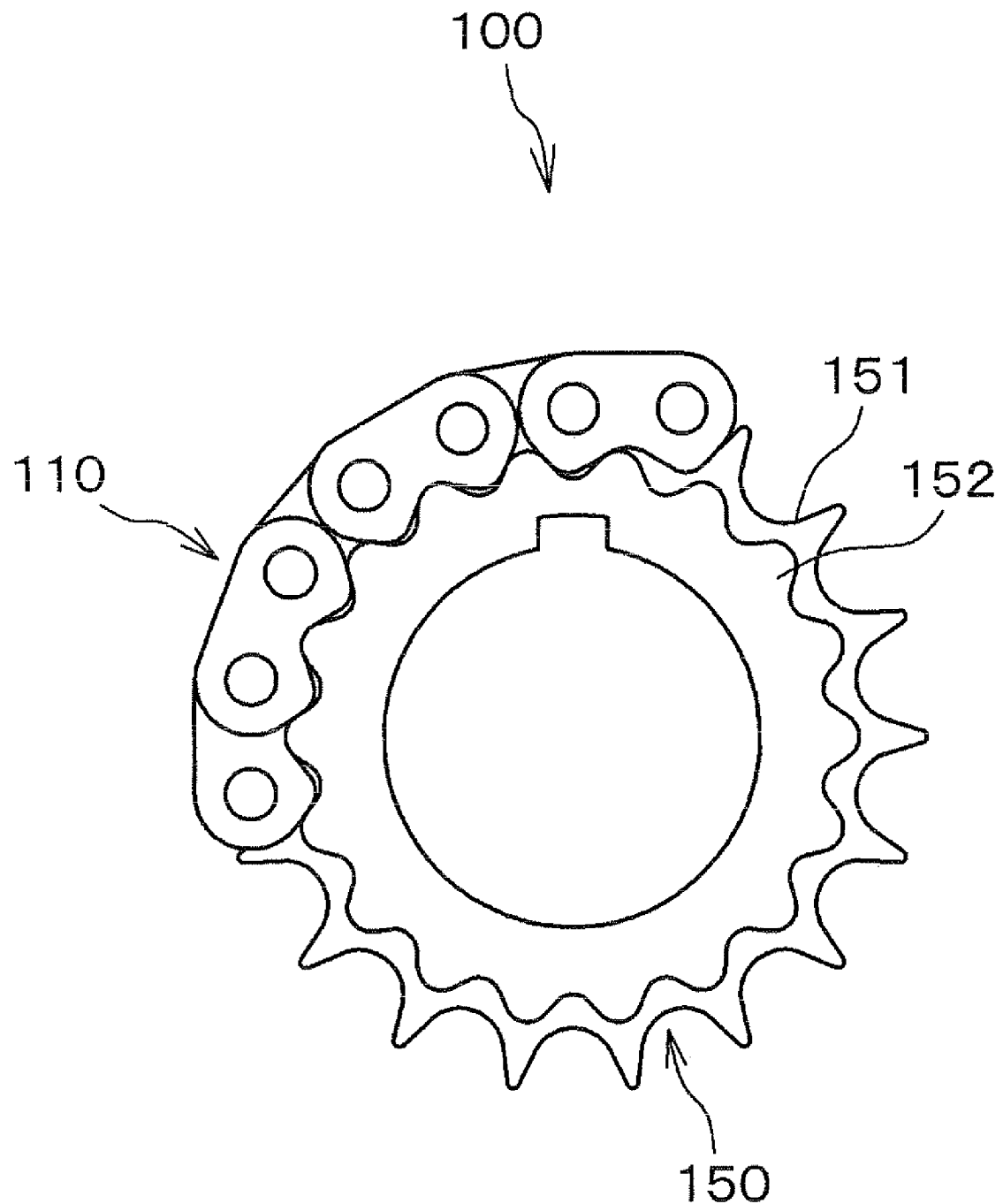
FIG. 2 is a side elevational view the chain transmission part of FIG. 1.

As shown in FIGS. 1 and 2, in the chain transmission according to the invention, a chain 110 is wrapped around a sprocket 150 to transmit driving force from the chain to the sprocket, or from the sprocket to the chain.

Figure 3:
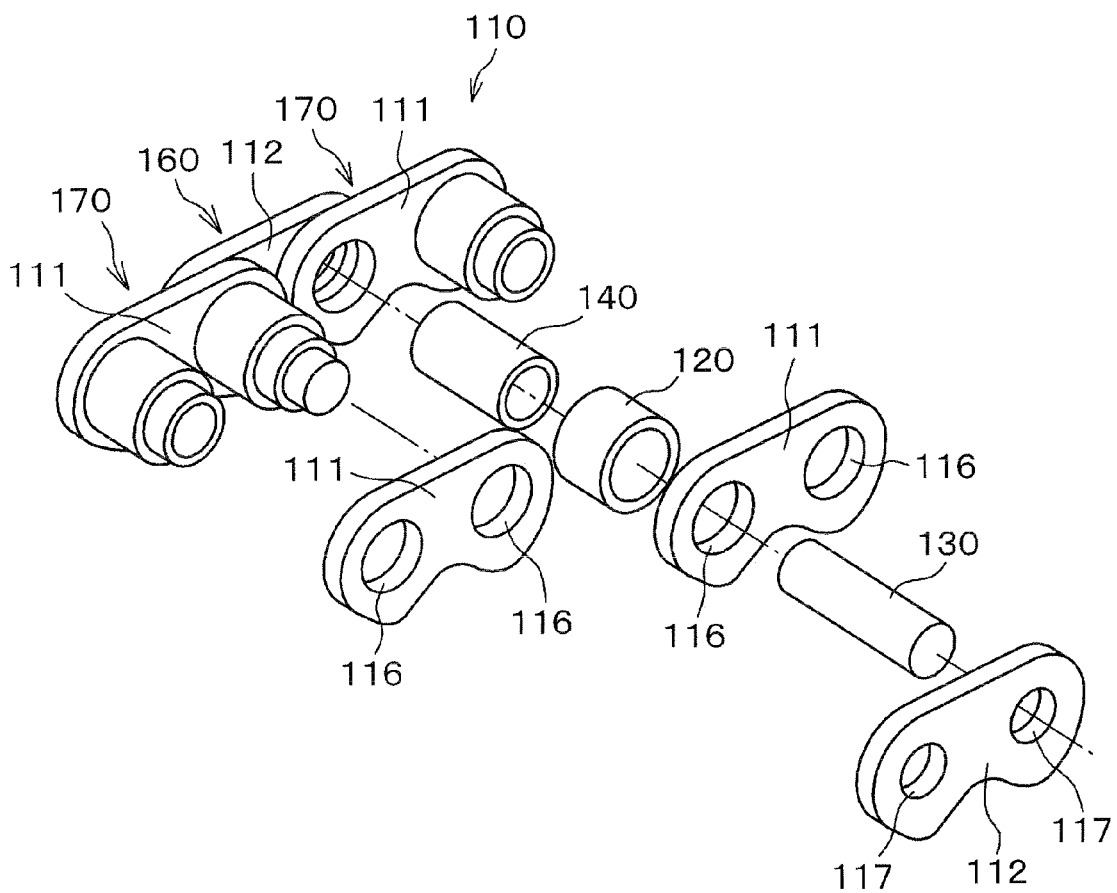
FIG. 3 is an exploded perspective view of a part of the chain in the transmission of FIGS. 1 and 2

As shown in FIG. 3, the chain comprises an outer link 160, in which the ends a pair of connecting pins 130 are secured in pin holes 117 in a pair of outer link plates 112, and an inner link 170, in which bushings 140 are respectively secured in respective front and rear bushing holes 116 of a pair of inner link plates 111. The inner and outer links are alternately connected to one another by loosely fitting the connecting pins 130 into the bushings 140. In the case of a roller chain, rollers 120 are provided on the bushings, and are rotatable on the bushings.

Figure 4:
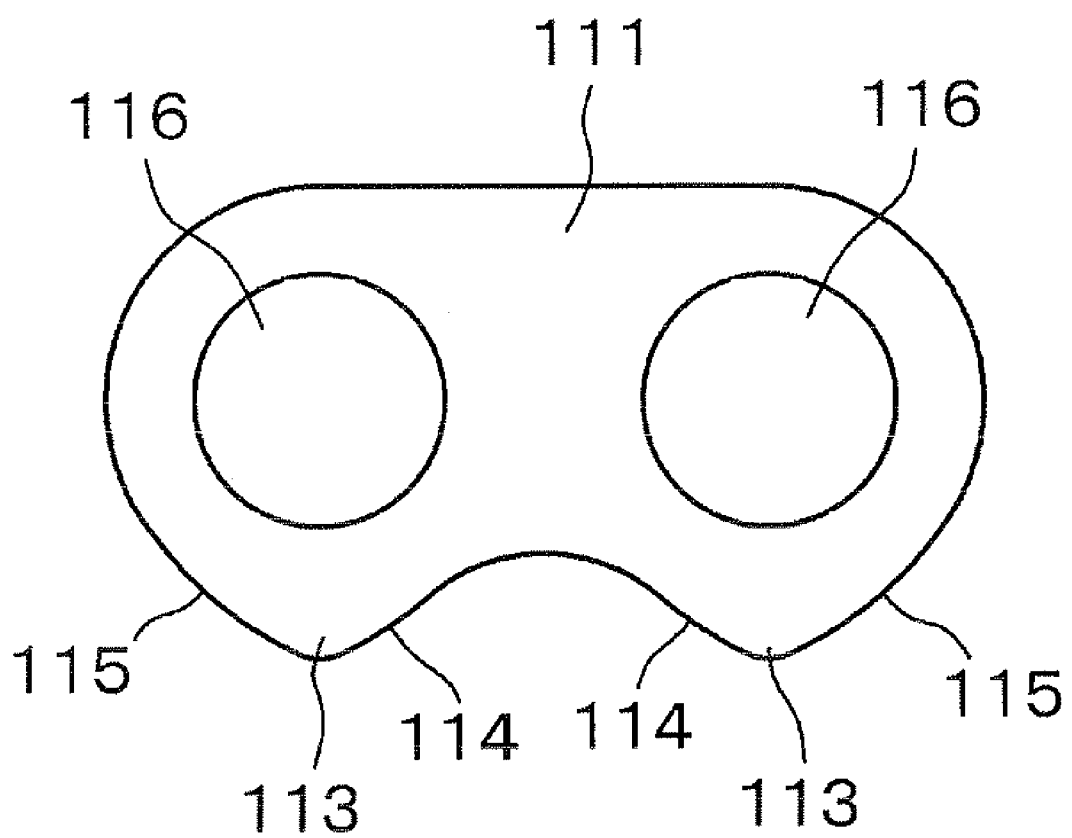
FIG. 4 is a side elevational view of an inner link plate of the chain shown in FIG. 3.

As shown in FIG. 4, the inner link plate 111 has front and rear bushing holes 116, and a pair of link plate teeth 113 under the front and rear bushing holes. Each link plate tooth 113 has an inner flank 114, facing the inner flank of the other tooth, and an outer flank 115.

Figure 5:
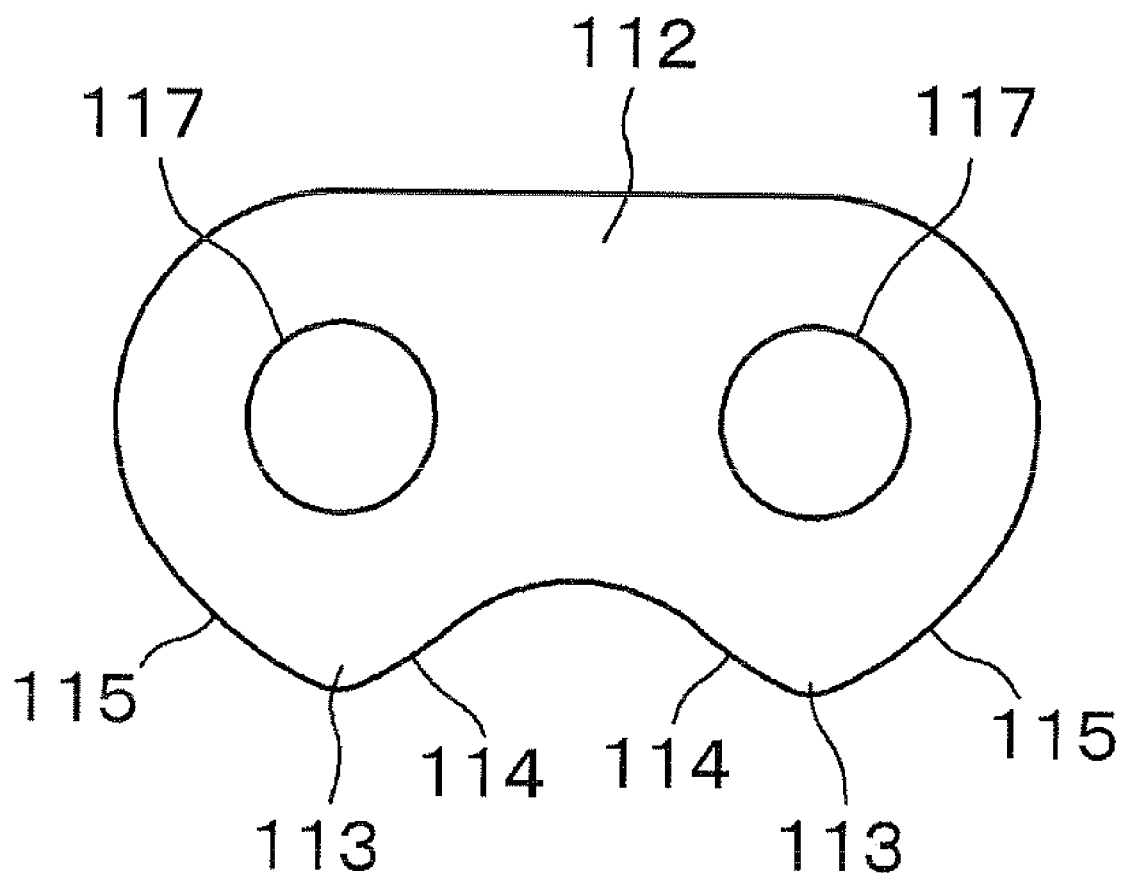
FIG. 5 is a side elevational view of an outer link plate of the chain shown in FIG. 3.

As shown in FIG. 5, the outer link plate 112 has front and rear pin holes 117, and a pair of link plate teeth 113 under the front and rear pin holes. Each link plate tooth 113 has an inner flank 114, facing the inner flank of the other tooth, and an outer flank 115.

The inner link plate 111 and the outer link plate 112 have the same shape, except that the bushing holes 116 and the pin holes 117 are different.

Figure 6:
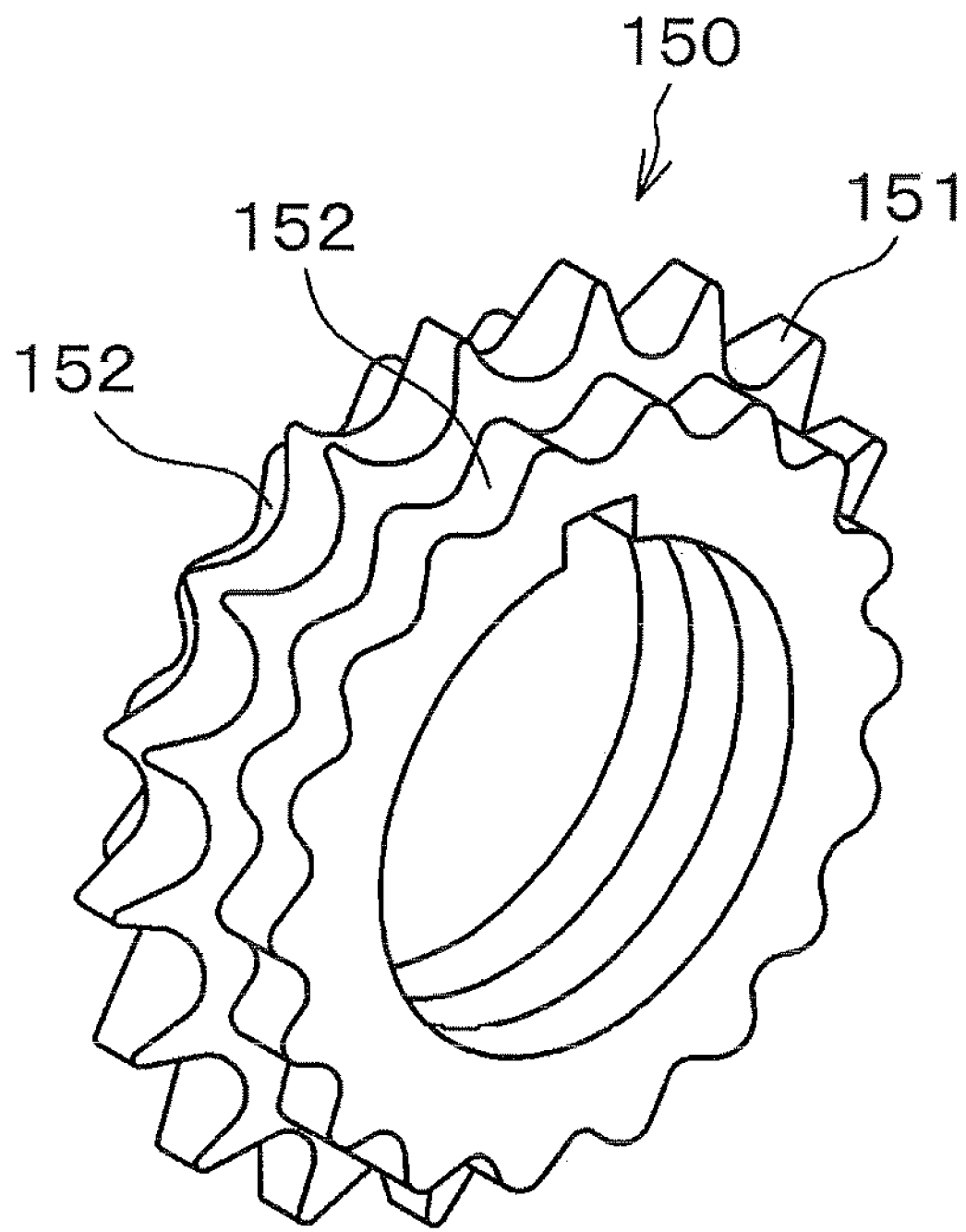
FIG. 6 is a perspective view of the sprocket of the chain transmission.
Figure 7:
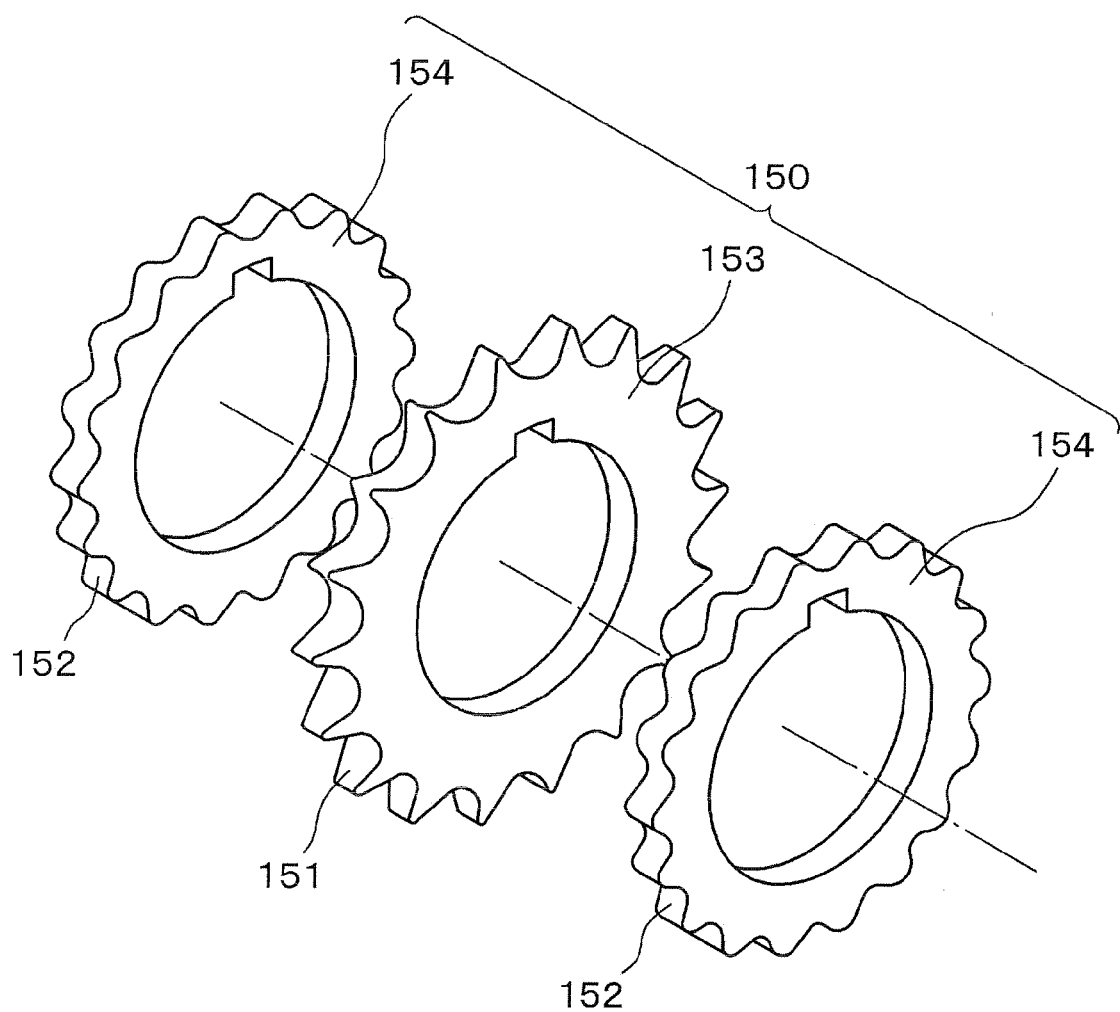
FIG. 7 is an exploded perspective view of the sprocket of FIG. 6.

As shown in FIGS. 6 and 7, the sprocket 150 is composed of a central sprocket 153 having sprocket teeth 151, which engage with rollers 120 of the chain 110, and side sprockets 154, each having side sprocket teeth 152, which engage with link plate teeth 113 of the chain. The side sprockets 154 are fixed on both sides of the central sprocket 153. Thus the central sprocket 153 and the side sprockets rotate together as a unit. Although, as shown in FIG. 7, the sprocket 150 consists of three components, it is possible to form the sprocket 150 as a unitary member.

The shapes of the link plate teeth 113, the sprocket teeth 151 and the side sprocket teeth 152 are formed such that, when the chain 110 is wound around the sprocket 150, the inner flank 114 of link plate tooth 113 positioned adjacent the forward end of the link plate (with reference to the direction of advancing movement of the chain) first comes into contact with a side sprocket tooth 152. Then, the roller 120 adjacent the forward link plate tooth comes into contact with a sprocket tooth 151. Then, as the following roller, i.e., the roller adjacent the rear tooth of the same link plate, is seated on a tooth gap bottom on the central sprocket, the outer flanks 115 of the teeth of the link plate come into contact with side sprocket teeth 152.

The teeth 151 of the central sprocket can have a standard tooth form. The link plate teeth 113 and the side sprocket teeth 152 are shaped so that the above-described sequence of movements takes place.

The operation of the chain transmission 100 will be described with reference to FIGS. 8 to 13, which illustrate the engagement of the chain with a sprocket rotating counterclockwise. The sprocket is shown in a fixed position, and the figures show sequential steps in the bending of the chain.

The term "forward" is used herein with reference to the direction of advancing movement of the chain. In FIGS. 8 to 13, link plates are designated L1, L2 and L3, plate L1 being forward of link plate L2, and plate L2 being forward of plate L3. Rollers are similarly designated a roller R1, R2 and R3, Roller R1 being forward of roller R2 and roller R2 being forward of Roller R3.

The forward link plate teeth of the link plates L1, L2 and L3 are designated H1f, H2f and H3f, respectively, and the rearward teeth are designated H1r, H2r and H3r, respectively. The outer flanks of the forward teeth are designated G1f, G2f, and G3f, and the inner flanks of the forward teeth are designated U1f, U2f, and U3f. The outer flanks of the rearward teeth are designated G1r, G2r and G34, and the inner flanks of the rearward teeth are designated U1r, U2r, and U3r.

Figure 8:
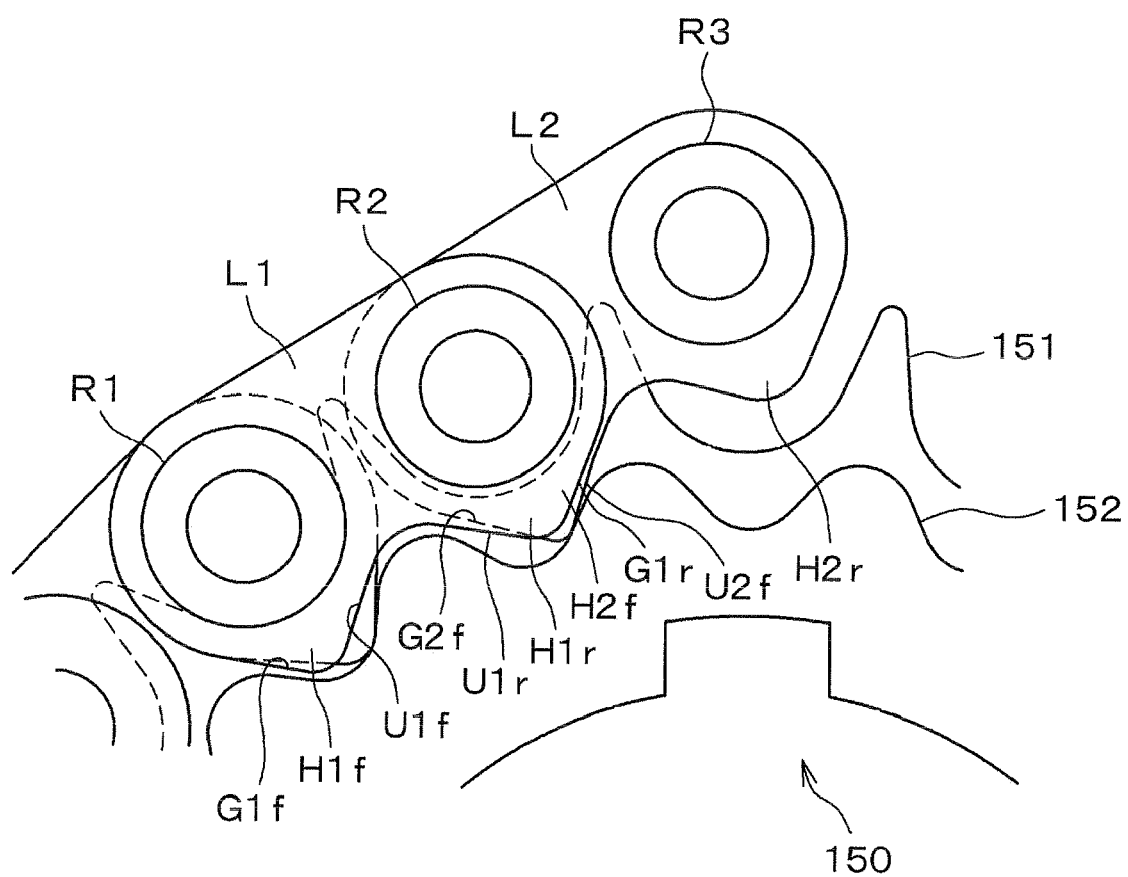
FIGS. 8-13 are schematic views illustrating the operation of the chain transmission.

The sequence of engagement will be described beginning at a stage, depicted in FIG. 8, in which a roller R1 is seated on the central sprocket. As the chain advances, link plate L1 is bent about roller R1, and roller R2 and link plate tooth H1r approach the sprocket 150. At the same time, a link plate tooth H2f of a link plate L2 also approaches the sprocket, and its inner flank U2f comes into contact with a side sprocket tooth 152 before the roller R2 and the link plate tooth H1r contact the sprocket.

The inner flank U2f and the side sprocket tooth 152 come into sliding contact, as in the case of a conventional silent chain. Consequently, only a small engagement noise is produced as the inner flank U2f contacts the sprocket tooth.

Figure 9:
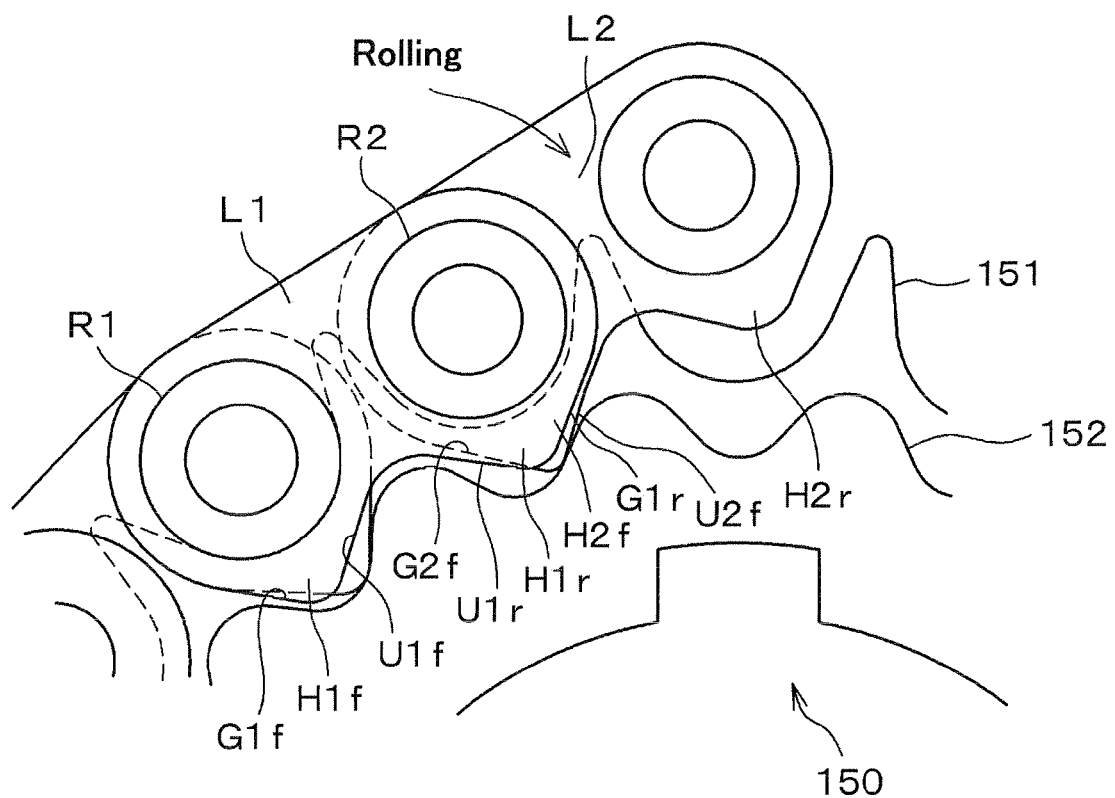

As the chain continues to advance, the inner flank U2f of link plate L2 starts bending while sliding on the tooth of the side sprocket tooth 152 as shown in FIG. 9, and the roller R2 gradually approaches sprocket tooth 151.

Figure 10:
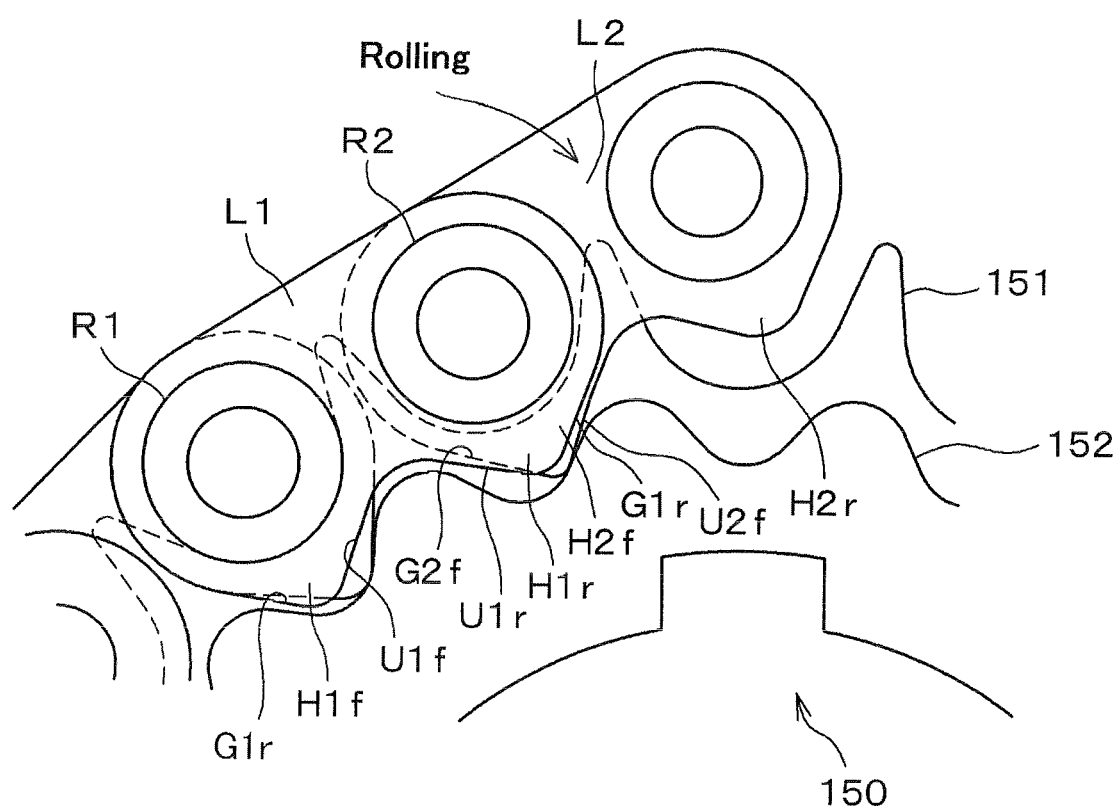

As shown in FIG. 10, winding of the link plate L1 onto the sprocket 150 is completed by the contact of the roller R2 with the sprocket teeth 151.

Since the contact of the roller R2 with the sprocket teeth 151 takes place gradually while the inner flank U2f of the link plate L2 is restricted by sliding on the surface of a side sprocket tooth 152, the noise generated by contact of the roller with the central sprocket teeth is much less than the noise generated by conventional roller chain.

The shapes of the link plates and the positions of the rollers are such that, when both rollers R1 and R2 are seated on the sprocket teeth 151, both outer flanks G1f and G1r of the link plate L1 come into contact with side sprocket teeth 152. Because the link plate L1 comes into contact with the side sprocket teeth 152 at two points on its outer flanks G1f and G1r, vibration and noise are reduced to a greater degree than in the case of a transmission using a conventional roller chain.

Figure 11:
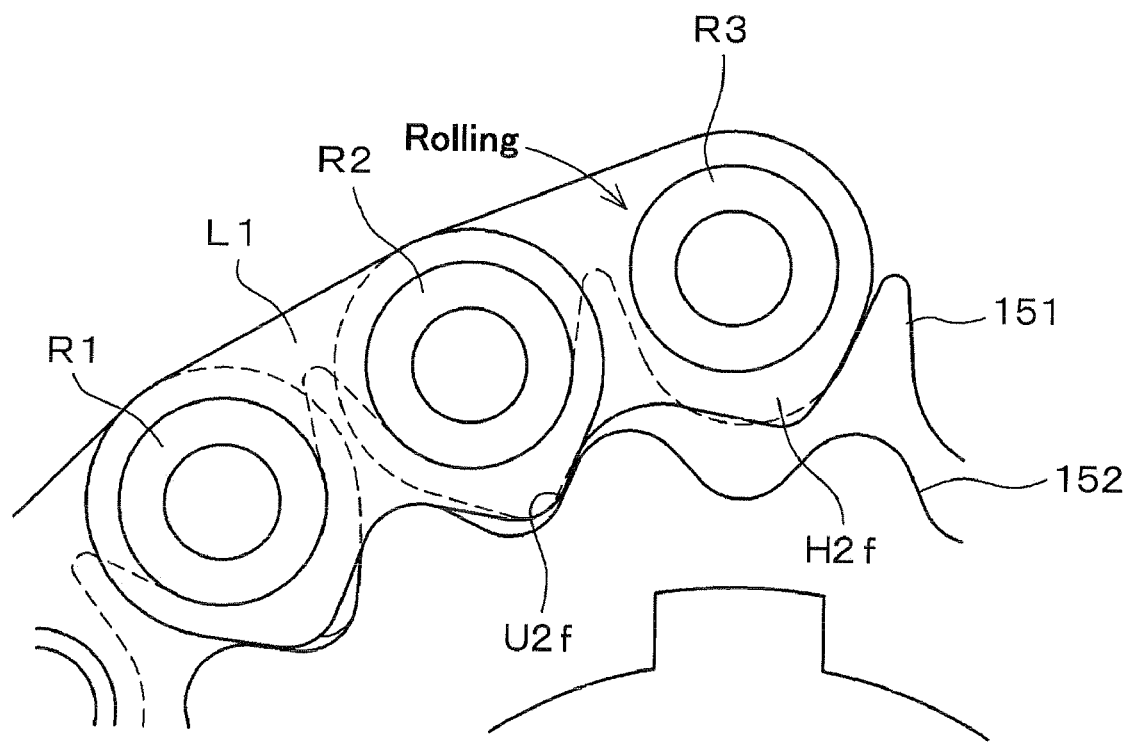
Figure 12:
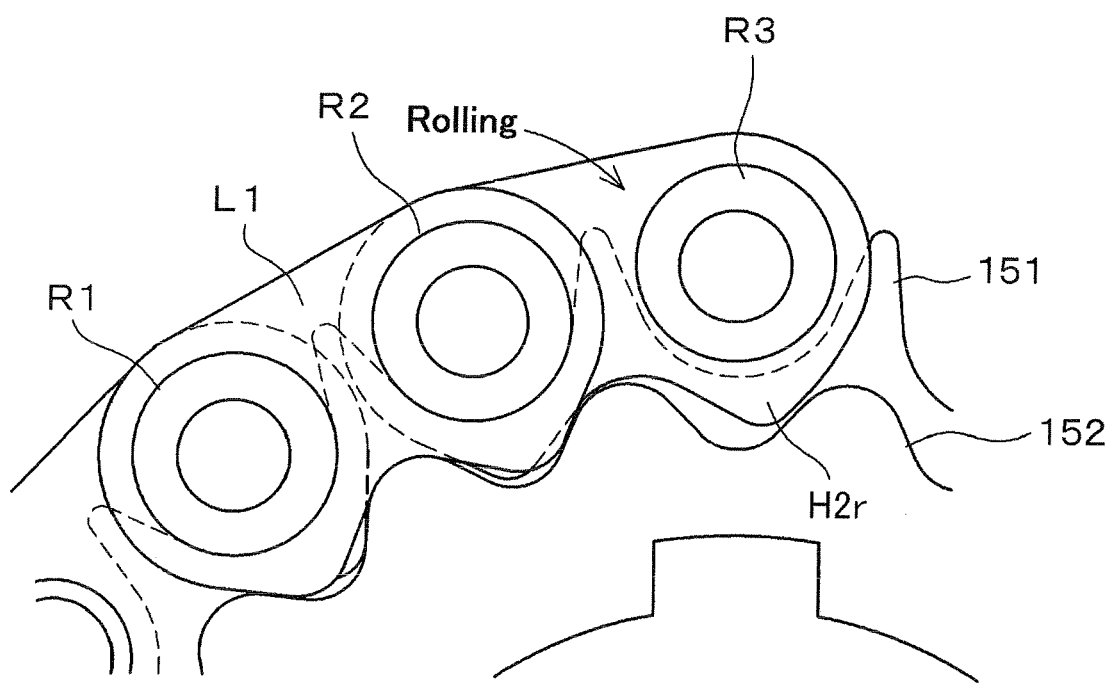

After the seating of the rollers R1 and R2, as shown in FIG. 11, the following link plate L2 starts bending about the roller R2, and its inner flank U2f is disengaged from a tooth surface of a side sprocket tooth 152. As shown in FIG. 12, a link plate tooth H2r of the link plate L2 and a roller R3 rapidly approach the sprocket.

Figure 13:
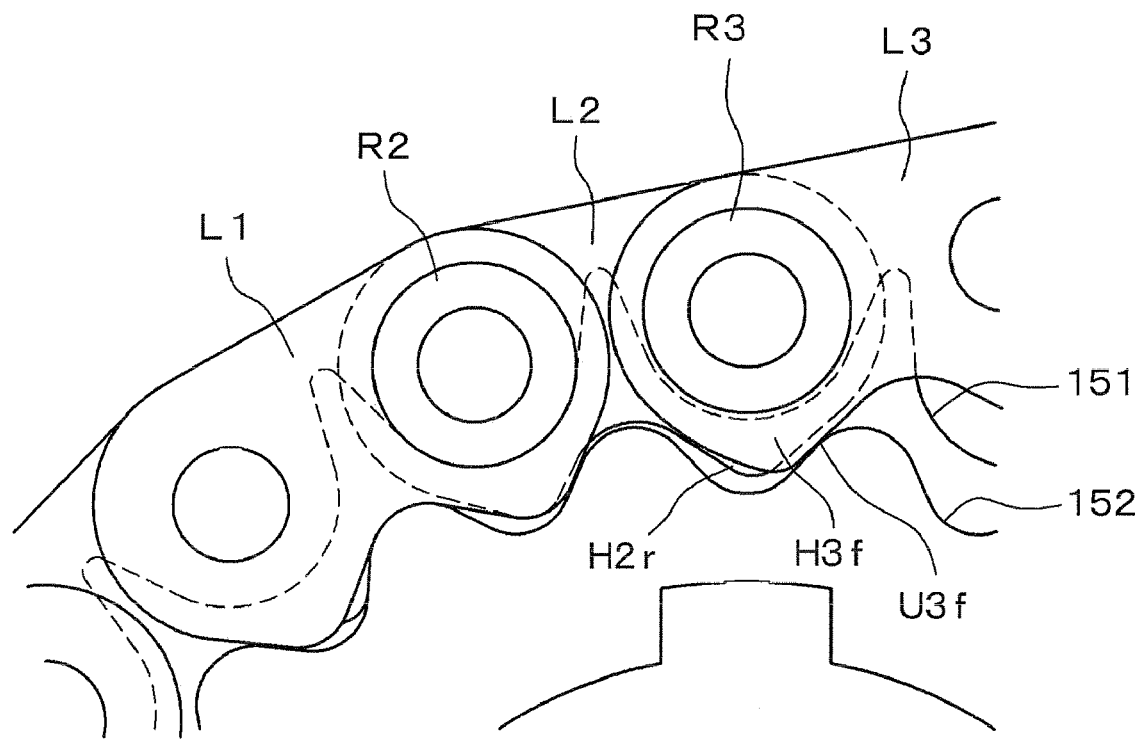

When the chain continues to advance as shown in FIG. 13, the link plate L2 continues to bend about roller R2, and the roller R3 and the rear tooth H2r of link plate L2 approach the sprocket 150. However, at the same time, a forward link plate tooth H3f of a link plate L3 also approaches the sprocket 150, and the inner flank U3f of the link plate L3 comes into contact with a sprocket tooth 152 before the roller R3 and the link plate tooth H2r contact the sprocket. As a result, the transmission reaches the condition shown in FIG. 8, with chain advanced by a distance corresponding to the chain pitch.

Contact between the rollers and the sprocket teeth occurs smoothly because it is restricted by contact between the link plates and the outer sprocket teeth. Therefore, with the chain transmission according to the invention, power transmission can be performed by rollers, while achieving a low noise level as in the case of chain transmission using a conventional silent chain. Moreover, a decrease in strength due to elongation resulting from wear of the connecting pins can be prevented.

The engagement between the link plate teeth 113 and the side sprocket teeth 152 is sufficient if it contributes to prevention of noise and vibration as the chain 110 advances toward the sprocket 150. The cooperation of the link plate teeth and the outer sprocket teeth also produces smooth winding of the chain around the sprocket and smooth disengagement of the chain from the sprocket 150. Since the function of power transmission is primarily carried out by engagement between the rollers 120 and the sprocket teeth 151, the heights of the link plate teeth 113 and the side sprocket teeth 152 can be at a minimum level, and the contact angles of the link plate teeth 113 and the side sprocket teeth 152 do not need to be as steep as those in a conventional silent chain.

Figure 14:
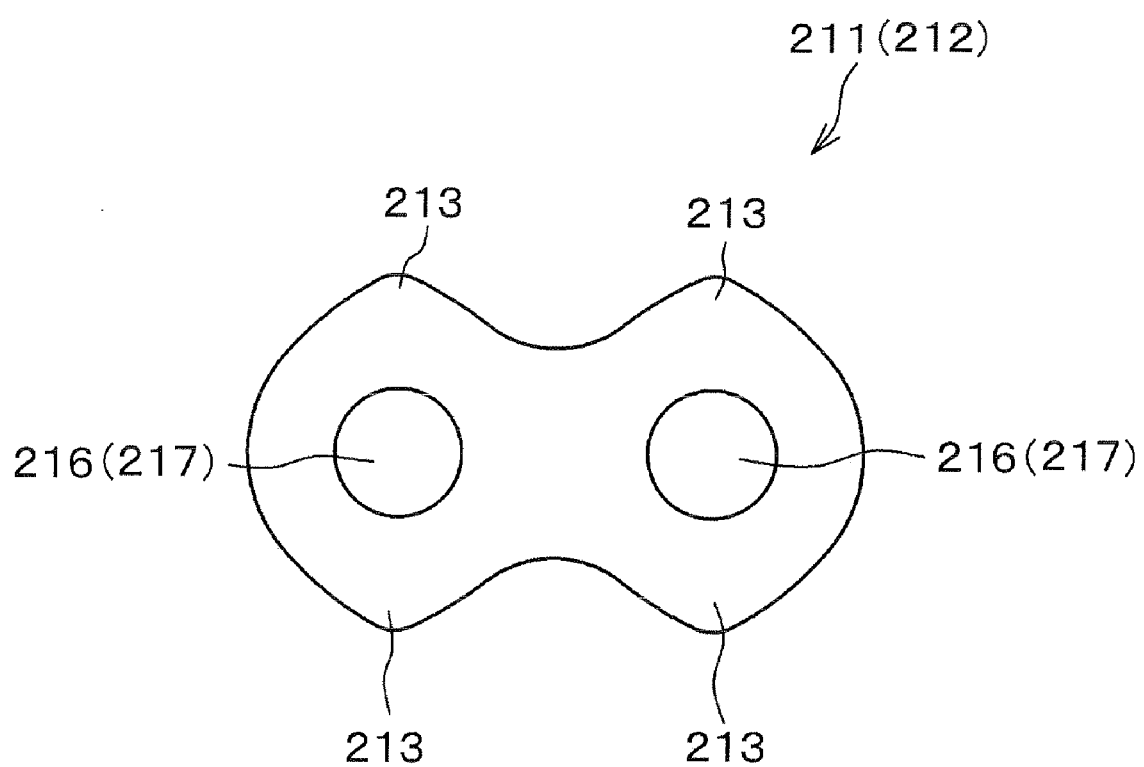
FIG. 14 is a side view of a link plate of a chain transmission according to another embodiment of the invention.
Figure 15:
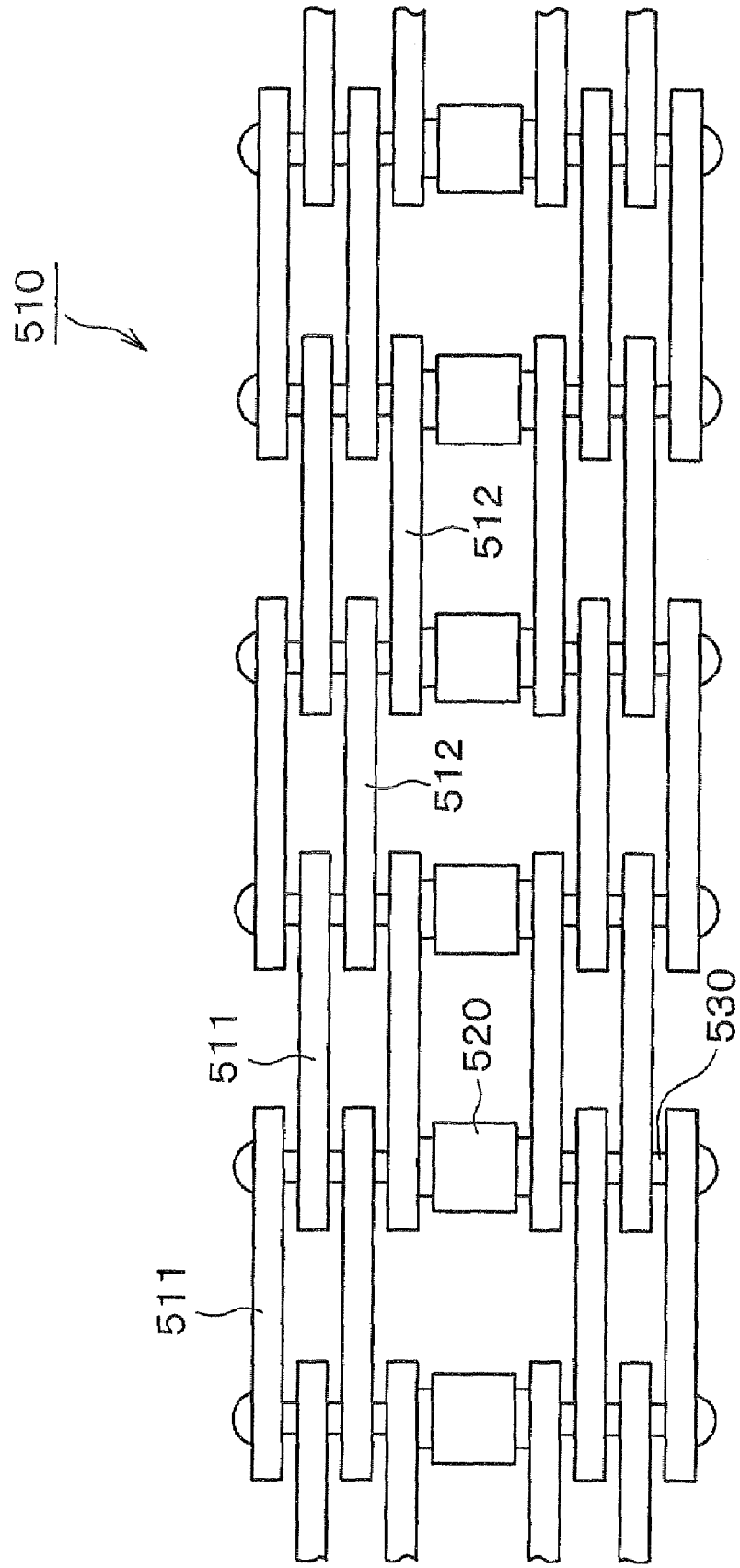
FIG. 15 is a plan view of a chain of a conventional hybrid chain transmission.
Figure 16:
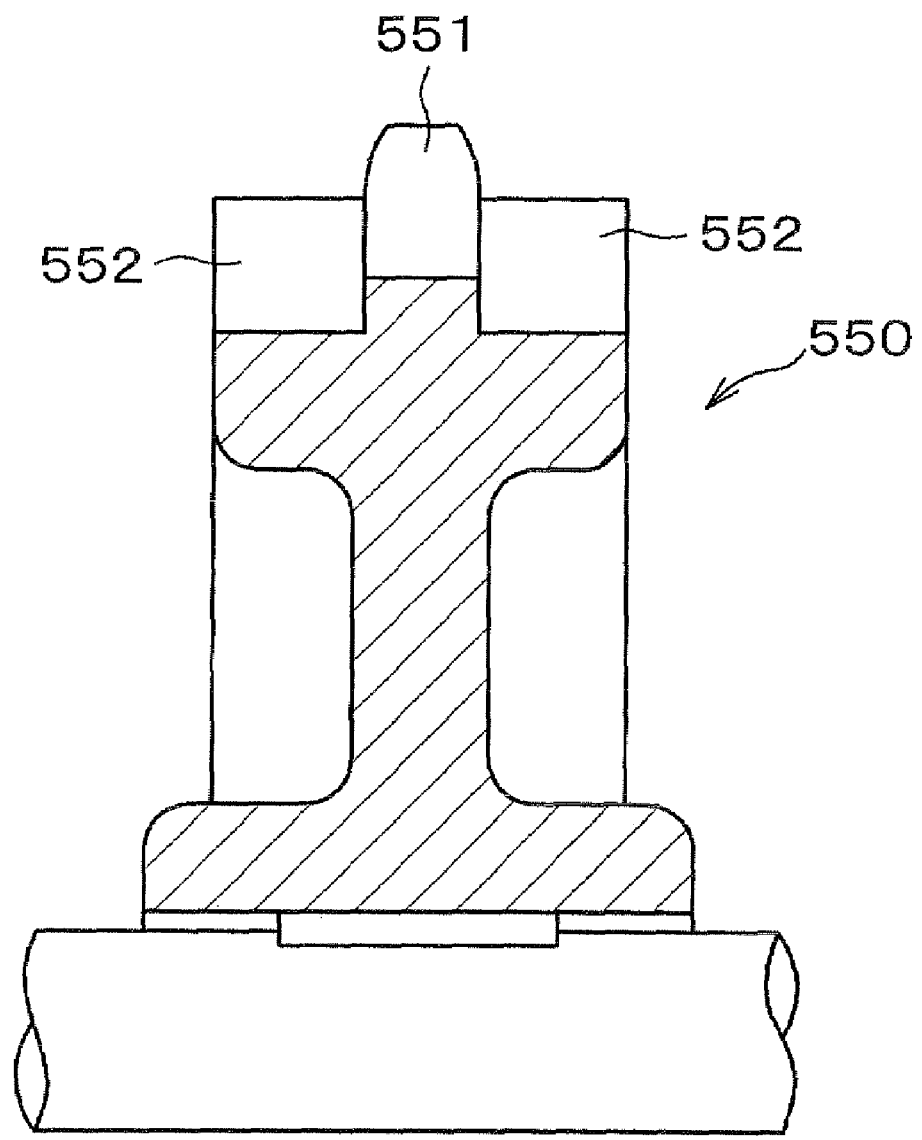
FIG. 16 is a cross-sectional view of the sprocket of a conventional hybrid chain transmission.

As shown in FIG. 14, if link teeth 213 are provided on both the upper and lower sides of the inner and outer link plates 211 and 212, assembly of the chain becomes easier, with no necessity to set the link plate 211 and 212 in a particular direction during assembly, as in the case of a conventional silent chain. In addition, when link plates corresponding to those shown in FIG. 14 are used, the chain can be used in a transmission in which the chain meshes with sprockets on the exterior of the loop formed by the chain as well as with sprockets on the interior of the loop.

The chain transmission of the invention can be used in a large variety of mechanisms, including, but not limited to, mechanisms for driving auxiliary engine equipment such as an oil pump or the like, timing drives for operating engine valve-operating camshafts, and in motive power transmissions and transfer systems.

Although the outer links and the inner links of the chain transmission of the invention may each have only a pair of outer link plates or a pair of inner link plates respectively, additional link plates may be included in the inner and/or outer links of the chain, and these additional link plates may be formed with or without link plate teeth. Therefore, some of the additional link plates may have link plate teeth, or all the link plates may have link plate teeth.

In a transmission according to the invention, central sprocket teeth and side sprocket teeth may be formed on a unitary sprocket member. Furthermore, in the transmission, a plurality of sprockets having both central sprocket teeth and side sprocket teeth, may be fixed to the same shaft.

Additionally, in the chain transmission according to the invention, at least one sprocket in mesh with the chain has side sprocket teeth. However, in some cases, all the sprockets in mesh with the chain will have side sprocket teeth.

We claim:

1. A chain transmission comprising a chain and a sprocket in mesh with the chain;

the chain comprising outer links and inner links in alternating, overlapping relationship;

each said outer link comprising a pair of outer link plates in laterally spaced relationship, the outer link plates of each said pair being connected by a pair of connecting pins secured respectively in front and rear pin holes in said pair of outer link plates;

each said inner link comprising a pair of inner link plates in laterally spaced relationship, the inner link plates of each said pair being connected by a pair of bushings secured respectively in front and rear bushing holes in said pair of inner link plates; and each said connecting pin of each said outer link extending through and being rotatable in one of said bushings of an inner link overlapping the last-mentioned outer link;

in which each of said outer link plates and each of said inner link plates are formed with front and rear link plate teeth, each of said front and rear link plate teeth having an inner flank and an outer flank;

in which said sprocket has central sprocket teeth which engage with said bushings or with rollers rotatable on said bushings;

in which said sprocket also has side sprocket teeth which engage with said front and rear link plate teeth;

in which the central sprocket teeth, and the side sprocket teeth have the same angular pitch, and each of the side sprocket teeth is laterally aligned with one of the central sprocket teeth; and in which said front and rear link plate teeth, the central sprocket teeth, and the side sprocket teeth are shaped so that, as the chain is wound around the sprocket, each of said outer and inner link plates bends relative to a preceding and overlapping one of said outer and inner link plates, said inner flank of the front link plate tooth of each of said outer and inner link plates first comes into contact with one of said side sprocket teeth, thereafter, as each of said outer and inner link plates is bending relative to a preceding and overlapping one of said outer and inner link plates, one of said bushings or rollers adjacent said front link plate tooth of said bending one of said inner and outer link plates comes into contact with one of said central sprocket teeth, and thereafter, as said one of said outer and inner link plates continues to bend relative to a preceding and overlapping one of said outer and inner link plates, when one of said bushings or rollers adjacent the rear link plate tooth of said bending one of said outer and inner link plates is seated on a tooth gap bottom of said sprocket, the outer flank of said front link plate tooth and the outer flank of said rear link plate tooth come into contact with said side sprocket teeth.

2. A chain transmission device according to claim 1, in which front and rear link plate teeth are provided on both upper and lower sides of said outer and inner link plates.

3. A chain transmission according to claim 1, in which said side sprocket teeth are provided on both sides of said central sprocket teeth.

4. A chain transmission device according to claim 3, in which front and rear link plate teeth are provided on both upper and lower sides of said outer and inner link plates.

5. A chain transmission according to claim 1, in which the number of said inner link plates in each said inner link is two, and in which the number of said outer link plates in each said outer link is two.

* * * * *